Feb. 19, 1935.   L. J. SIMONS   1,991,426
LIGHT EMITTING DEVICE
Filed Jan. 15, 1932   2 Sheets-Sheet 1
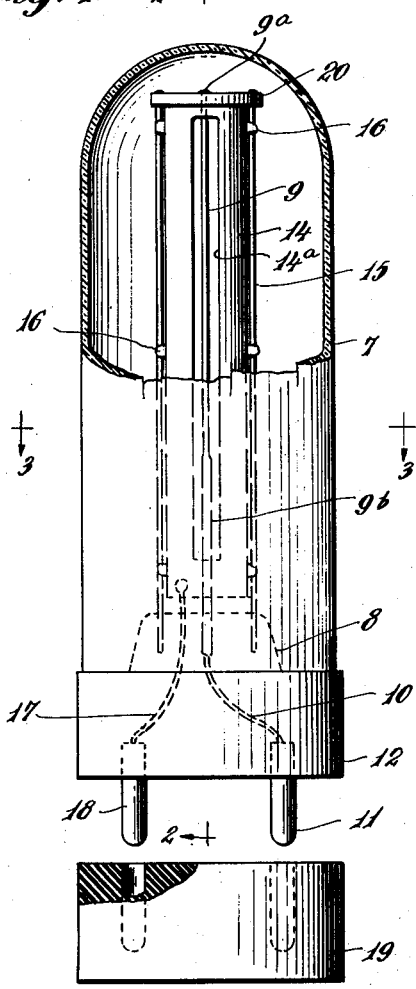
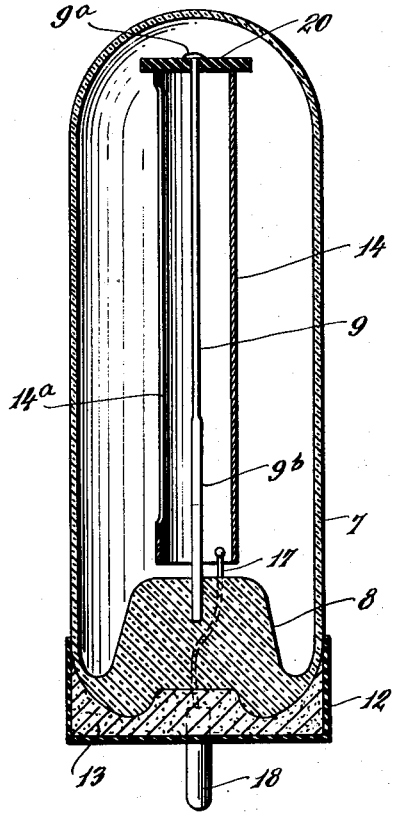
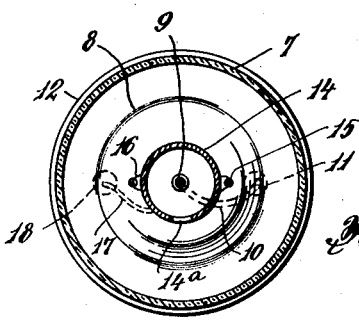
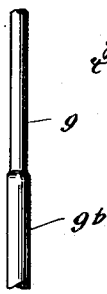

Feb. 19, 1935.　　　L. J. SIMONS　　　1,991,426
LIGHT EMITTING DEVICE
Filed Jan. 15, 1932　　　2 Sheets-Sheet 2
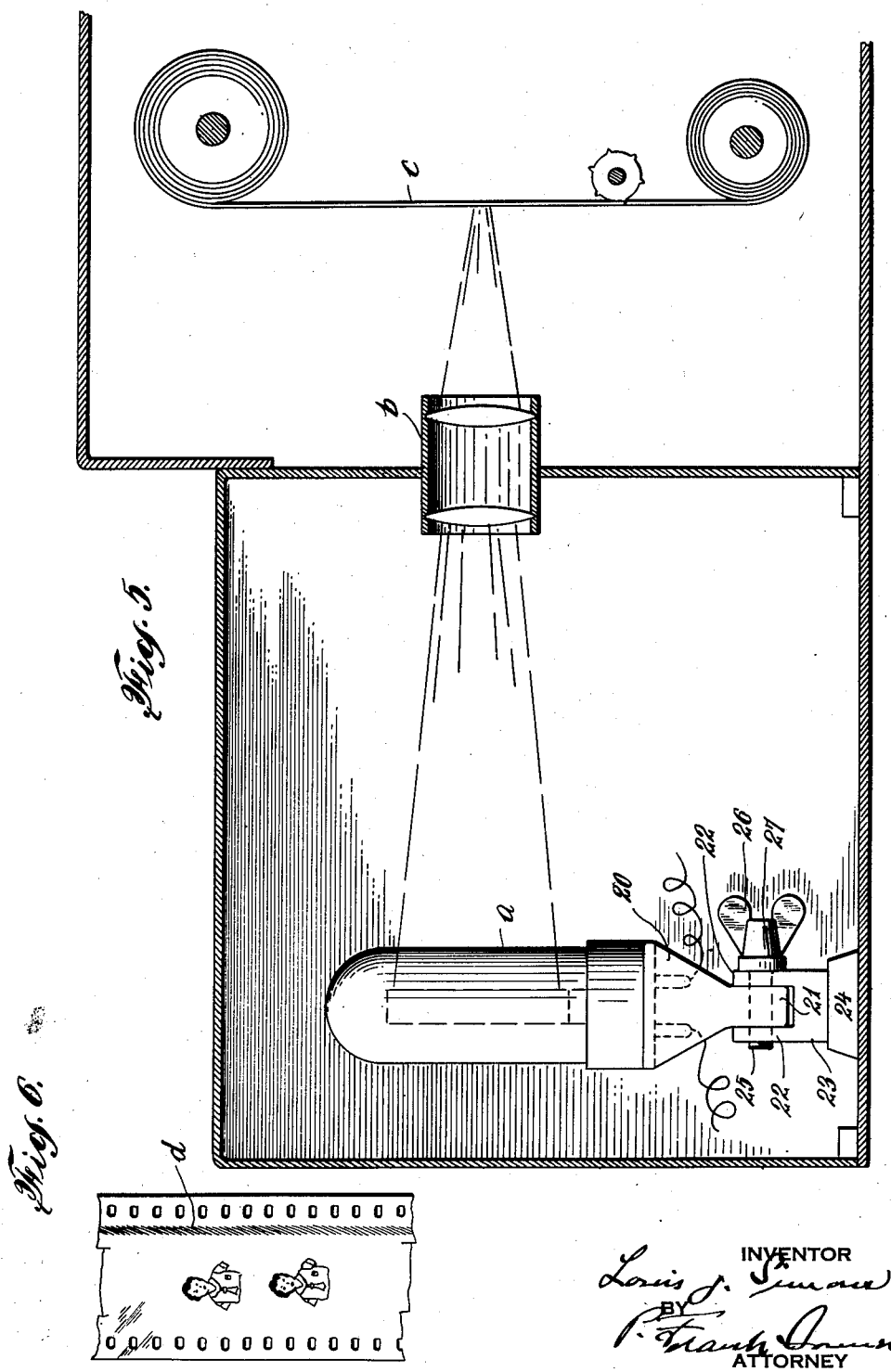

Patented Feb. 19, 1935

1,991,426

UNITED STATES PATENT OFFICE 1,991,426

LIGHT EMITTING DEVICE

Louis J. Simons, New York, N. Y.

Application January 15, 1932, Serial No. 586,845

4 Claims. (Cl. 176—122)

This invention relates generally to electrical illumination and is more particularly directed to a lamp or so-called luminous tube that, while especially adapted for use in photographically recording sound waves or vibrations upon a sensitized surface, as a film, such as used in the production of motion and sound pictures, is also susceptible of numerous other applications, as in practicing sound analysis processes, in apparatus for reproducing television images and in the production of illuminated signs for advertising and other purposes, as well as in many forms of apparatus where it may be substituted for existing types of light emitting devices.

While, as stated, my light tube or luminous discharge device has a wide range of utility, for the purposes of this disclosure, I have elected to show and describe it, as it may be employed in photographically recording sound vibrations, wherein certain characteristics that are inherent to the tube are not only productive of greater efficiency in the practicing of existing processes of photographic sound recording, in conjunction with which it may be used, but provide an entirely new method of photographing sound vibrations upon a motion and sound picture film, whereby certain restrictions in recording that are now presented by the limited width of the so-called sound track upon the film may be readily overcome to attain various advantages which, hereinafter, will become apparent. However, in confining this description, more or less, to this specific use of my luminous discharge device, and the practicing of the method of photographic sound recording that it makes possible, I would have it understood that it is done merely for illustrative purposes and is not to be construed as a limitation of the scope of application or utility of my invention in any way whatsoever. As will be clearly manifest, as the description proceeds, those characteristics of my light tube or luminous discharge device, which render it particularly responsive to the requirements of photographic sound recording, may also be utilized to great advantage in other fields, in which electrical illuminating elements are employed, such, for example, as those hereinbefore mentioned.

As is well known, in photographically recording sound waves or vibrations under present methods or processes, various types of light-emitting devices have been employed, as the neon gas tube and those generally classified as of the cathode type. However, with all of these devices, clarity in recording sound input at its normal value has not been achieved, due to various causes, such, for instance, as poor characteristics of light emission and responsiveness to the transmitted impulses, which result in a lack of sharpness of delineation in the photograph of the lines of the basic vibrations and their harmonics and overtones, or what is commonly termed "fuzziness". In attempting to compensate, in part, for the shortcomings of present light-emitting devices, some processes resort to pre-amplification of the sound input, especially in the lower frequencies, while others depend upon final amplification. However, in either case, the distortion which results from amplification materially detracts from the reproduction and is productive of what are commonly described as unnatural sound effects. In musical tones, as in the speaking voices, the losses in shading in the photographic image and the distortion flowing from amplification, obviously, must seriously affect the faithfulness of reproduction.

While efforts have been made to improve the light emission by increasing the voltage of the operating current and the size and capacity of the tubes or lamps, these expedients have not been successful in attaining the desired ends. The same applies to those proposed devices, wherein means are provided for exaggerating the light impulses produced by the waves of higher frequencies, so that at present there is not available in the art a commercially practicable luminous discharge device or light-emitting medium that will function to register a true photographic image of normal sound input in all its frequencies and variables.

Therefore, it is the primary object of this invention to provide a light-emitting means or luminous discharge device that may function in response to a constant flow or input of electrical energy to produce light beams of greater brilliancy or intensity than is obtainable by present types of electric lamps or luminous discharge devices of a corresponding size, or similar electrical capacity, operating upon a current of the same voltage and amperage, whereby my illuminating device may be utilized in various ways in processes and apparatus where electrical illumination is essential or desirable for performing certain work, or producing particular lighting conditions or light effects.

More specifically, it is the object of this invention to provide a luminous discharge device, having the characteristics heretofore pointed out, which will function in processes of recording sound vibrations photographically, to materially improve the photography and produce an image of the sound input that will possess a clarity of definition in the component vibrations, which, heretofore, it has been impossible to obtain, thereby not only eliminating certain steps of such processes, as they are now practiced, with their resultant simplification, but insuring greater fidelity in the reproduction of the sounds that have been recorded.

A further object of my invention is to provide a luminous discharge device or light-emitting means that will be capable of responding to electrical impulses produced by sound vibrations with penetrative light beams of variable intensity and length whereby both the transverse and longitudinal vibrations of a sound wave will be reproduced in light waves having identical characteristics, for the purpose of producing an exact photographic image of the sound vibrations from which the electrical impulses originate.

It is also an important object of this invention to provide a method and means of utilizing my aforesaid light-emitting or luminous discharge device in photographically recording sound wave vibrations upon a film, whereby the restrictions to lengthening the record of the longitudinal vibrations of the sound waves that are now imposed by the standard sound track upon the film may be overcome in a simple manner, with a resultant improvement in the reproduction of the recorded sound vibrations.

Other objects and advantages flowing from the practicing of my invention, as herein disclosed, will doubtless become evident as the description proceeds, and I would have it clearly understood that I reserve unto myself all rights to the full range of equivalents both in structure and in use of my luminous discharge device, as well as of the steps of my herein described method of photographically recording sound, to which I may be entitled, under my invention in its broadest aspect.

In the accompanying drawings, I have illustrated a preferred embodiment of my light-emitting or luminous discharge device and the manner in which it may be utilized in practicing the new method or process of photographically recording sound on film that is made possible by the characteristics of my said device. Of course, it will be understood that my luminous discharge device may take other forms and that it may be used in various ways for obtaining the results to which the herein-described new method of photographically recording sound vibrations is directed, without departing from the spirit and scope of this invention, as defined by the appended claims.

In the drawings

Figure 1 is an elevation, partly in section, of a light-emitting or luminous discharge device embodying my invention and a supporting base.

Figure 2 is a horizontal cross-section on the line 2—2 of Figure 1.

Figure 3 is a vertical transverse section on the line 3—3 of Figure 1.

Figure 4 is a view in elevation of a fragment of the central electrode enlarged to more clearly disclose the increased diameter of the lower portion thereof.

Figure 5 is a diagrammatic view, illustrative of the practicing of my improved method of photographic sound recording, and Figure 6 is a plan view of a fragment of film, showing the relationship of the sound track to the picture action area and the sound vibrations as recorded thereon by my method.

Referring now to the drawings in detail, in which like characters of reference are employed to designate similar parts in the several views, my improved light-emitting or luminous discharge device embodies the usual preferably glass vessel or container 7 which may have the customary integrally formed mount 8 at one end. An electrode 9, preferably formed from aluminum, electrolitically plated with chromium for a distance of about one-third of its length from its lower end, is embedded or otherwise supported in the mount 8 and connected by a suitable wire or other conductor 10 through said mount to the prong 11, dependant from the bottom of the cup-like base 12 of insulated material, within which the vessel or container 7 is seated and secured in position by the cementitious material 13. Of course, the vessel or container 7 may take other forms and in lieu of producing it from glass it may be made of other material and provided with a transparent or translucent light-emitting window, as a longitudinally disposed slot, on its periphery; also the base 12 may be made of any suitable non-conductive material and may take other shapes than that shown.

Surrounding the electrode 9, and concentric therewith, is a second electrode of tubular cross section as indicated at 14, which is provided with a longitudinally disposed slot 14ª, the said electrode 14 being supported in spaced relation to the mount 8 between the preferably parallel metal rods 15, to which the electrode 14 may be fixed in any suitable manner, as by spot welding at vertically spaced points along the length of the electrode, or by providing ears or protuberances 16 on the periphery of the latter, through which the rods 14 may be passed for interlocking engagement in any suitable manner. In lieu of the metal rods 15, the electrode 14, which is preferably formed of pure nickel, may be supported between glass rods, to which it may be fixed, for non-relative movement in any practical way, or the said electrode may be suspended between wires extending from end to end of the vessel or container 7, for which purpose the head end of said vessel or container may include a wire-anchorage, generally corresponding to the mount 8.

The electrode 14, similarly to the electrode 9, is connected through the mount 8 and the base 12, by a suitable conductor 17, to the prong 18, the two prongs 11 and 18 being adapted to enter the complemental conductor sockets 19ª and 19ᵇ in the receptacle 19, to form paths for electrical energy between said sockets and the electrodes 9 and 14, the sockets having suitable external terminals through which electrical connections to the receptacle may be established.

As will be observed, the tubular electrode 14, is closed at its upper or head end by a preferably annular disc 20 of mica or other material of similar non-conductive properties, to which the upper end of the central electrode 9 may be connected, as by riveting, as at 9ª, the said disc or plate 20 being preferably restrained against lateral movement by suitable connections with the rods 15, as shown, or by interlocking engagement with the tubular electrode 14.

The container or vessel 7, at any preferred stage in the production of the light-emitting device, is evacuated in conformity with general practice and then charged with hydrogen gas and argon gas in equal proportions, at substantially normal pressures.

Now, assuming that the light-emitting device is functioning in a sound-recording process, the central electrode 9 becomes luminous, the luminosity varying in consonance with the current variations produced by the sound waves impinging upon the microphone, the portion of the central electrode 9 of increased circumference providing a wider path for the electrical energy collected by the electrode in this zone in the ionization of the gases, than obtains along the remaining portion thereof. This enlargement of the electrode 9, operates to appreciably increase the intensity of the glow or luminosity in the zone in which it occurs, wherein the vibrations in the lower frequencies are impressed, thus assuring a sufficient area of luminosity to permit of the reproduction in light discharge of the full range of amplitude of the sound vibrations at the normal value of input, as well as in length. In other words, the widened path that is provided for reproducing the vibrations of low frequencies, makes it possible for my device to respond to all of the variations in longitudinal and transverse vibrations that the input sound wave may possess so that with a proper optical system, an exact image of the sound wave in all its variables may be impressed or photographed upon the receiving surface, as the film sound track. In addition to the increased area that is afforded by the enlarged portion of the electrode 9 for the low frequency vibrations, it will be evident that this electrode also provides a path for the longitudinal vibrations in the sound wave of higher frequencies that is of ample length for the light oscillation to respond thereto, within the range of audibility to the human ear.

As ionization of the gases occurs within the confines of the tubular electrode 14, under the electronic bombardment that is set up by the electrical impulses transmitted to the light-emitting device, collision and recombination of the ions of opposite signs, due to the differences in electrical potential, occurs in proximity to the central electrode 9, which is conducive to a condition along this electrode that is productive of an extremely high quality of luminescence in every phase of light oscillations, the basic red and blue steel glows emanating from the hydrogen and argon gases, combining or blending to produce a light of bluish hue, and great brilliancy and intensity, possessing rays of high penetrability.

From the foregoing, it will be seen that I have provided a device which will emit light of great brilliancy or intensity with penetrative characteristics that are not obtainable in other forms of luminous discharge devices or light-emitting means, these properties, manifestly, being especially valuable in photographically recording sound, by making it possible to attain a clarity of definition in photographic images of sound vibrations, that can only flow from the use of concentrated light rays of high brilliancy or intensity and penetrativeness, the combination of elements that I employ in producing my light-emitting device, enabling me to attain this long-desired objective, operating upon normal current input and with minimum gas pressures and resultant thermal conditions that materially prolong the life of the device and promote its commercial practicability.

In Figure 5 of the drawings, I have illustrated a preferred method in which my light-emitting device may be employed in practicing my improved process of photographically recording sound vibrations upon a strip of film, wherein the light-emitting device is generally indicated at a, while an optical system b is interposed between the light-emitting means and the film c, which is fed past the focal point of the rays projected by the system b in the customary manner, it being obvious that the film is enclosed within a suitable compartment or housing to which the light emitted by the device a may have access only through the aforesaid optical system b.

The light-emitting means a, in the practicing of this process, may be mounted on a specially formed base 20, embodying sockets complemental to the hereinbefore described prongs 11 and 18, for making the requisite electrical connections for the light-emitting means, which may be formed with a dependent portion or extension 21 that is locatable between the arms 22 of the bifurcated member 23 having a base 24 adapted to be fixed to the light-emitting device housing. As will be observed, the aforesaid dependent portion or extension 21, is hinged or rockably connected to the member 23 by a jointly cooperating screw 25 upon which a wing nut 26 is threaded in engagement with the washer 27 to exert clamping effort upon the arms 22 of the bifurcated member to hold the extension 21 non-rotatable relatively thereto. Of course, in lieu of this particular arrangement, spring means may be interposed between the extension 21 and the arms of the bifurcated member, or other expedients may be followed for locking the base 20 in the position desired relative to the fixed support 24, it being obvious that the purpose of the hinge mounting is to permit of the arcuate movement of the light-emitting device a transversely of the longitudinal axis of the optical system b.

Due to the characteristics of the light-emitting device, as heretofore pointed out, in conjunction with the framing of the area of light emission, obtained by the slot 14ª in the electrode 14, the length of the photographic image is much greater than it is possible to attain in existing processes utilizing present types of light-emitting mediums, with the hereinbefore described advantages in recording the full range of longitudinal vibrations of the sound waves of high frequencies. Therefore, in order to make this important attribute of my light-emitting means available, in the limited area of the present sound tracks, I have provided for the disposition of the sound image upon the film track at an angle of approximately 60 degrees from the vertical, as indicated at d in Figure 6, which may be accomplished by the adjustment of the light-emitting device to a like degree on its hinged support, as previously pointed out.

Of course, it will be understood that, in the use of my light-emitting means in photographing sound vibrations, the photographic image may be impressed upon the film sound track in vertical or horizontal lines, in accordance with what is now standard practice. However, by the angular disposition of the image, as described, I am enabled to record sound upon the sound track provided on 16 mm. film that will possess all of the values of the longitudinal and transverse vibrations, with the harmonics and overtones, that it is impossible to record on the limited area of the 16 mm. sound track under processes now extant. In fact, with my improved recording process, sound reproduction from 16 mm. film, equal to that which may be obtained by recording on the wider sound track of the standard exhibition or 35 mm. film, is entirely feasible.

While I have described my light-emitting means in its application in sound photography, it will be manifest, as previously pointed out, that the combination of elements set forth, or certain equivalents, may be utilized in adapting my invention to many other uses. For example, the central electrode 9 which functions as the collector of luminescence, or as a path for the illumination, may be of any length and shaped to produce any design, figure, or letter, or combination of letters, in the production of an illuminated sign, operating on a constant or modulated electrical current of high or low potential, in conjunction with a cooperating conforming surrounding electrode, as 14 herein, within which the ionization of a gaseous mixture occurs. Obviously, the electrode-formed design or symbol may be enclosed in a suitable transparent or translucent housing, corresponding in function to the vessel or container 7, or one which is opaque and provided with sight openings or windows in registration with the electrode design. Again, the enclosing vessel may be a continuous tube conforming to the outlined electrode design, as in advertising and other signs of the neon and Hewitt types.

Further, a plurality of electrodes corresponding to the electrode 9 arranged in any suitable relatively spaced relationship, may be employed, in utilizing my light-emitting device for reproducing television signals to produce an image in brilliant and penetrating light upon a screen of larger dimension than is possible in any system of television signal reproduction now available, due to the fundamental characteristics of light emission heretofore disclosed, and their greatly enhanced value flowing from the plurality of light sources synchronizing one with the other in response to modulated or unmodulated electric signals or impressions received by the device.

Both or either of the electrodes 9 and 14 may be constituted of metals or metallic alloys, other than specified, which will possess those characteristics that are essential to the attainment of the functioning conditions herein described, in conjunction with the ionization of hydrogen and argon gases or a combination of gases having equivalent properties; also, such changes or variations in the other components of my light-emitting device as may be necessary or desirable to meet the requirements of specific uses may be effected in attaining the objectives to which my invention is directed, as hereinbefore set forth, within the purview of the appended claims.

I claim:

1. A light-emitting device, embodying an evacuated vessel, a negative electrode supported therein, said electrode embodying an electrically effective portion of greater diameter than the remainder thereof, a positive electrode surrounding said negative electrode in spaced relationship thereto and means for supporting said positive electrode from a part of said vessel.

2. A luminous discharge device for use in processes for photographically recording sound upon film, comprising an evacuated vessel, a negative electrode mounted on the longitudinal axis of said vessel, said electrode having a portion of greater cross sectional area than that of the remainder thereof, a positive electrode of a tubular formation surrounding said negative electrode, said positive electrode being provided with a longitudinally disposed slot, means for rigidly supporting said positive electrode in spaced relationship to said vessel and a closure for one end of said positive electrode of non-conductive material, said closure being connected to said negative electrode.

3. A light-emitting device, for use in photographically recording sound waves upon film, comprising a vessel embodying a mount, an electrode in the form of a rod supported from said mount centrally of said vessel, a portion of said electrode extending from its supported end having a cross sectional area slightly greater than that of the remainder of said electrode, a second electrode, tubular in shape, surrounding said first electrode, means for supporting said second electrode from said mount with its longitudinal axis concentric to that of said first electrode, a disc of non-conductive material fixed to the free end of said first described electrode and forming a closure for the adjacent end of the tubular electrode and an opening in the wall of said tubular electrode for rendering visible the portion of said first electrode enclosed within said tubular electrode.

4. A light-emitting device for use in photographically recording sound waves upon film, comprising a sealed vessel containing gas, an electrode disposed axially thereof, said electrode having portions of different cross-sectional area, the portion of greater area being adjacent the base of said vessel, a second electrode in the form of a tube, closed only at its upper end and supported from the base of said vessel, surrounding said first electrode, both of said electrodes being of substantially the same length, and a single means for emitting light produced by the ionization of the gas within the confines of said second electrode, said means comprising a slot disposed longitudinally of said second electrode and extending substantially from end to end thereof, the light emitted in the zone of the greater transverse sectional area portion of said first electrode being of greater intensity than that emitted through the remainder of said slot.

LOUIS J. SIMONS.